(12) United States Patent  
Kundel et al.

(10) Patent No.: US 12,405,982 B2
(45) Date of Patent: Sep. 2, 2025

(54) TOOL FOR PROVIDING CONTEXTUAL DATA FOR NATURAL LANGUAGE QUERIES

(71) Applicant: Twilio Inc, San Francisco, CA (US)

(72) Inventors: Dominik Kundel, Oakland, CA (US); Ian Morich, Oakland, CA (US); Brian Partridge, Austin, TX (US)

(73) Assignee: Twilio Inc., San Francisco, CA (US)

( * ) Notice: Subject to any disclaimer, the term of this patent is extended or adjusted under 35 U.S.C. 154(b) by 0 days.

(21) Appl. No.: 18/360,431

(22) Filed: Jul. 27, 2023

(65) Prior Publication Data

US 2024/0354321 A1   Oct. 24, 2024

Related U.S. Application Data

(60) Provisional application No. 63/496,763, filed on Apr. 18, 2023.

(51) Int. Cl.
 G06F 16/33    (2025.01)
 G06F 16/334   (2025.01)

(52) U.S. Cl.
 CPC ............................... *G06F 16/3344* (2019.01)

(58) Field of Classification Search
 CPC .................................................. G06F 16/3344
 USPC ........................................................ 707/718
 See application file for complete search history.

(56) References Cited

U.S. PATENT DOCUMENTS

| | | | | |
|---|---|---|---|---|
| 8,190,627 B2* | 5/2012 | Platt | ...................... | G06F 16/242 707/767 |
| 8,364,613 B1* | 1/2013 | Lin | .......................... | G06N 7/01 700/65 |
| 8,370,280 B1* | 2/2013 | Lin | .......................... | G06N 5/04 706/12 |
| 10,275,519 B2* | 4/2019 | Cohn | ..................... | G06N 20/00 |
| 10,445,356 B1* | 10/2019 | Mugan | .................. | G06F 16/345 |
| 11,347,803 B2* | 5/2022 | Prabhugaonkar | .......................... G06F 16/90332 | |
| 11,500,865 B1* | 11/2022 | Wang | ..................... | G06N 3/045 |
| 11,604,794 B1* | 3/2023 | Nallapati | .......... | G06F 16/24522 |
| 11,741,305 B2* | 8/2023 | Skaljin | .................... | G07C 5/008 706/15 |
| 11,782,917 B2* | 10/2023 | Chaudhuri | ............ | G06F 3/0482 704/9 |
| 12,008,308 B1* | 6/2024 | Zimmerman | .......... | G06N 20/00 |
| 12,271,698 B1* | 4/2025 | Wang | ................ | G06F 16/24522 |
| 2015/0331850 A1* | 11/2015 | Ramish | .................. | G06F 40/40 704/9 |

(Continued)

*Primary Examiner* — Hanh B Thai
(74) *Attorney, Agent, or Firm* — LOWENSTEIN SANDLER LLP

(57) ABSTRACT

Techniques and systems are described that perform automated identification and retrieval of contextual information for quick and accurate processing of user queries by artificial intelligence generative models. The techniques include receiving a natural language (NL) query associated with a user identifier (ID) and obtaining, using a first NL generative model, contextual data that is pertinent to the NL query and is associated with the user ID. The techniques further include generating an augmented NL query that is based on the NL query and the contextual data. The techniques include communicating the augmented NL query to a recipient that includes the first NL generative model, a second NL generative model, or a user session associated with the user ID.

16 Claims, 7 Drawing Sheets

(56) References Cited

U.S. PATENT DOCUMENTS

| | | | |
|---|---|---|---|
| 2016/0378861 A1* | 12/2016 | Eledath | G06V 20/52 707/766 |
| 2017/0206797 A1* | 7/2017 | Solomon | G06N 3/006 |
| 2018/0052915 A1* | 2/2018 | Cohn | G06F 16/3344 |
| 2018/0337927 A1* | 11/2018 | Carnahan | H04L 63/10 |
| 2020/0244700 A1* | 7/2020 | Moon | G06F 40/35 |
| 2020/0394190 A1* | 12/2020 | Chaudhuri | G06F 16/243 |
| 2021/0162261 A1* | 6/2021 | Neumann | G06F 18/23213 |
| 2021/0390096 A1* | 12/2021 | Rahmfeld | G10L 15/08 |
| 2021/0390099 A1* | 12/2021 | Rahmfeld | G06F 16/26 |
| 2022/0050840 A1* | 2/2022 | Parravicini | G06N 5/025 |
| 2022/0092066 A1* | 3/2022 | Teja | G06F 16/24522 |
| 2022/0171820 A1* | 6/2022 | Neun | G06F 16/9537 |
| 2022/0179665 A1* | 6/2022 | Rathod | G06F 9/451 |
| 2022/0188661 A1* | 6/2022 | Tappin | G06F 16/248 |
| 2023/0079074 A1* | 3/2023 | Cella | G06F 16/2462 707/769 |
| 2023/0153534 A1* | 5/2023 | Bansal | G06F 16/3329 704/9 |
| 2023/0196033 A1* | 6/2023 | Robert Jose | G06F 40/30 704/9 |
| 2023/0208869 A1* | 6/2023 | Bisht | G06N 7/01 726/23 |
| 2023/0236857 A1* | 7/2023 | Ferrucci | G06F 40/205 707/723 |
| 2023/0237271 A1* | 7/2023 | Ferrucci | G16H 70/60 707/726 |
| 2023/0274086 A1* | 8/2023 | Tunstall-Pedoe | G06F 40/20 704/9 |
| 2023/0315722 A1* | 10/2023 | Saxe | G06F 16/3322 726/1 |
| 2023/0315856 A1* | 10/2023 | Lee | G06N 3/08 |
| 2023/0368468 A1* | 11/2023 | Eckart | G06N 3/0495 |
| 2024/0202582 A1* | 6/2024 | Schillace | G06N 3/045 |
| 2024/0346234 A1* | 10/2024 | Zhang | G06F 40/166 |

* cited by examiner

TOOL FOR PROVIDING CONTEXTUAL DATA FOR NATURAL LANGUAGE QUERIES

RELATED APPLICATIONS

This application claims the benefit of U.S. Provisional Application No. 63/496,763, filed Apr. 18, 2023, the entire contents of which is being incorporated herein by reference.

TECHNICAL FIELD

Embodiments of the present disclosure relate to computing systems, and more specifically, to methods and systems for facilitating interactivity with artificial intelligence platforms.

BACKGROUND

Artificial intelligence (AI) applications include generative models (chatbots) capable of carrying out a dialogue with a user via a text and/or text-to-speech interface. Dialogues resemble those that a user would have with a human. Chatbots are computer programs capable of having a conversation with a user in natural language, understanding the user's intent, and responding in ways that the user expects from a conversational partner. Chatbots are often implemented using large language models (LLMs), which are neural networks with billions of artificial neurons, e.g., deep learning neural networks with a self-attention mechanism (such as transformer neural networks). Chatbots are used for customer service interactions, responding to information requests, travel itinerary planning, generating documents, content, and many more tasks whose range is quickly expanding. Chatbots assist users in many fields, including health care, education, entertainment industry, finance services, e-commerce, news, productivity, and/or the like.

BRIEF DESCRIPTION OF THE DRAWINGS

The disclosure is illustrated by way of example, and not by way of limitation, and can be more fully understood with references to the following detailed description when considered in connection with the figures, in which.

DETAILED DESCRIPTION

Figure 1:
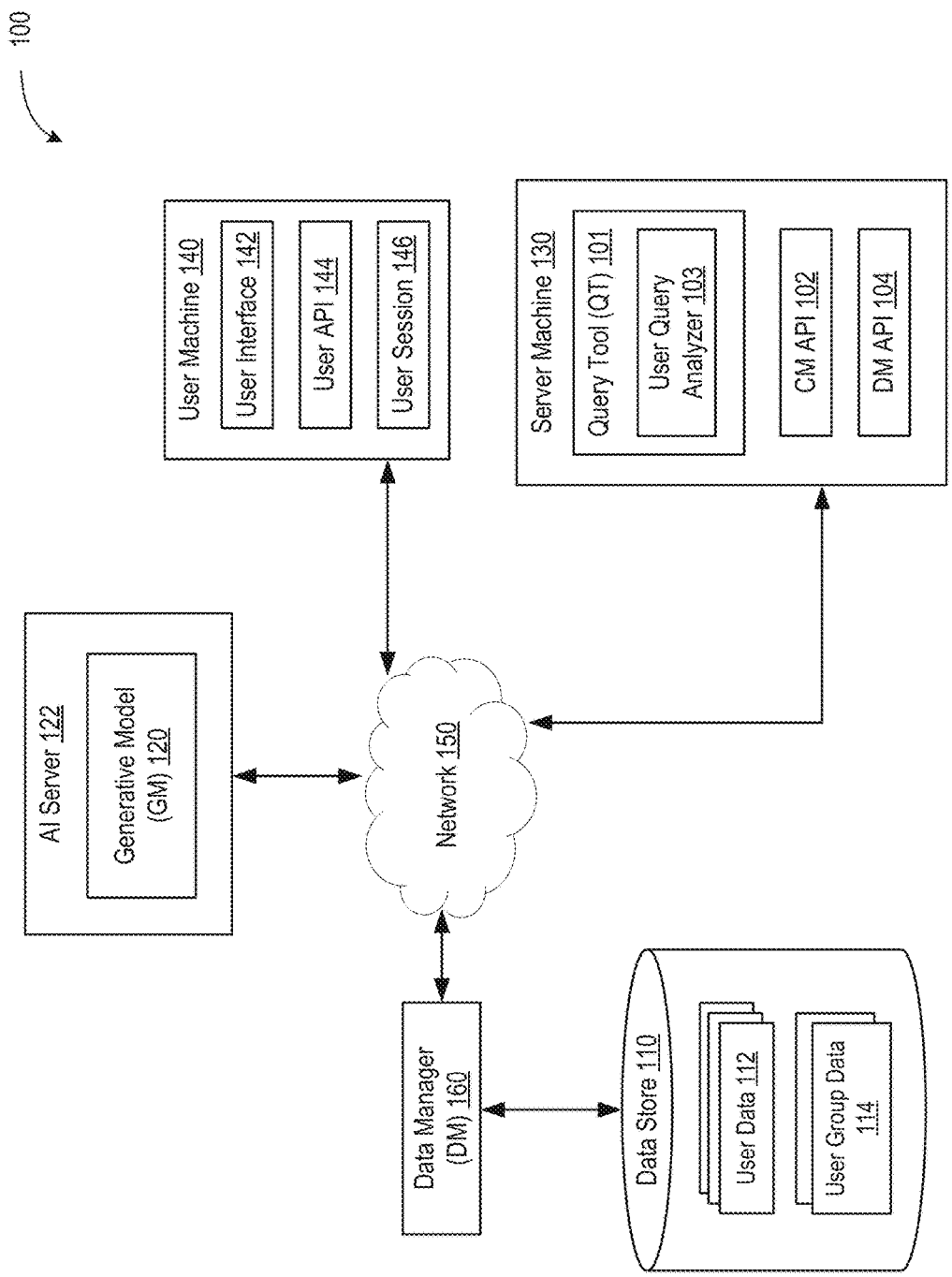
FIG. 1 illustrates a high-level component diagram of an example architecture, in accordance with one or more embodiments of the present disclosure.

Chatbots and other AI applications often provide configurability capabilities to users who may fine-tune a model to their specific needs. For example, a user may modify the way a model's responses are delivered to the user, e.g., adjust the tone and voice of the model. A user may cause the model to undergo additional training on user-provided and/or user-identified data, e.g., using a knowledge base that is relevant to the user's interests and activities. During additional training, the model learns to perform pattern matching and find content relevant to the user. Such re-training often yields excellent results for teaching a model to work with technical data but is less efficient for teaching the use of contextual information. It is also possible to fine-tune a generative model at the time when tasks (e.g., requests, queries, etc.) are being presented to the model. This process is known as prompt engineering. More specifically, a user or a developer may provide a context as part of an input prompt (e.g., with context embedded into the input as a preamble). This causes the model to seek additional training, e.g., as directed by the prompt, about how to accomplish the requested task. Prompts may include specific instructions. For complex tasks, prompts may be quite elaborate and may include multiple (e.g., tens or more) instructions.

Prompt engineering may be used to provide a model with relevant user (customer) data. However, the amount of data available for a given user may be very large and may include data that is unrelated to the specific user request that needs to be answered. Placing such data directly into the preamble of a query may limit the effectiveness of the generative model in identifying the context that is relevant to the query. For example, if a user asks a model to recommend a restaurant, the relevant contextual information may include the user's address, restaurants previously visited by the user, review grades given by the user to those restaurants, and/or the like. But numerous other information, e.g., out-of-state trips made by the user, the user's employment and education histories, etc., may be irrelevant and may detract the model from providing an accurate response. On the other hand, not providing any user data to the model may cause the model to ask one or more follow-up questions aimed to identify the relevant contextual information. This consumes additional computing resources, increases the time needed to obtain a meaningful response, requires the user to expend additional effort to answer such follow-up questions, and may decrease the overall user satisfaction.

Aspects and embodiments of the instant disclosure address the above-mentioned and other challenges of the existing technology by providing for systems and techniques capable of automatically identifying contextual information relevant to user's requests (queries and/or prompts) and take advantage of the data available about user's traits and activities. Rather than providing all user data with the query or relying on the user to respond to follow-up questions from the model, a query tool (QT) may obtain contextual information that is pertinent to the query. The query tool may be able to accomplish this without requesting direct user's involvement. In one example embodiment, the QT may receive a user query (e.g., "recommend a restaurant") and may first generate a first (intermediate) query to the generative model asking for any additional data that the model may need to process the query (e.g., "what information will you need to recommend a restaurant to User?"). The model may process the intermediate query and generate a response to the QT (e.g., "location of User and history of User's restaurant visits"). Having received the response to the first query, the QT may generate a request to a data store that holds User's data. If the QT does not have access to the data store, the QT can create a request and send it to a component capable of accessing the data store. The request may include any suitable keyword search requesting data indicated in the response from the model. Having received the requested data from the data store, the QT may generate a second query (e.g., "recommend a restaurant to User who resides in Springdale, East Virginia, and likes Italian, Indian, and Mexican food") and communicate the second query to the model. The QT may then communicate the response to the second query to the User.

In another example embodiment, the QT may receive a user query and may generate a request to a data store for user data that may be pertinent to the user query. The request may be generated based on keywords detected in the user query, or in any other suitable way. The data store may identify stored user data relevant to the QT request and return the identified data to the QT. The QT may then generate an intermediate query to the model (or a secondary, lightweight, model accessible to the QT). The intermediate request may be a targeted request that includes a representation (e.g., a summary, a list of titles, a digest of available data, etc.) of the data received from the data store (e.g., "what information in the user query would be useful for future customer interactions?"). Having received the response from the model (or the secondary model), the QT may select context data identified by the model as useful for responding to the user query and may provide the selected context data to the user. The user may then communicate the user query to the model together with the provided context data. Alternatively, the QT may generate a context-based query, which may include the original user query and the selected context data, and provide the context-based query to the user. The user may review, modify (if needed), and forward the context-based query to the model. In some instances, the model may user's own preferred model, a commercially available model, or an open-source model.

In some embodiments, the QT may generate the first query internally and direct the first query to a suitable query analyzer (parser) that may determine what type of additional data may be needed without asking the model. The query analyzer may be a separate natural language processing (NLP) model implemented as part of the QT or an algorithmic model that generates one or more keyword searches after parsing the user query. In some embodiments, the query analyzer may be an embeddings model that generates word embeddings for various words in the user query, identifies various other vocabulary words having close embeddings (and, therefore, close semantic and/or contextual meanings), and generates search requests for the identified words for the data store.

Operations of the QT and, specifically, interaction of the QT with various other systems and components may be supported by one or more application programming interfaces (API), e.g., a user API to facilitate two-way communications between a user and the QT, a model API to facilitate two-way communications between the QT and the generative model, data store API to facilitate two-way communications between the QT and the data store, and/or the like.

The advantages of the disclosed techniques include but are not limited to efficient and automated identification and retrieval of relevant and timely contextual information for quick and accurate processing of user queries without extensive follow-up questioning of the user.

FIG. 1 illustrates a high-level component diagram of an example system architecture 100, in accordance with one or more aspects of the present disclosure. The system architecture 100 (also referred to as "system" herein) includes a data store 110, a generative model 120 provided by AI server 122, a server machine 130 with QT 101, one or more user machines 140, and/or other components connected to a network 150. In some embodiments, network 150 may be a public network (e.g., the Internet), a private network (e.g., a local area network (LAN) or wide area network (WAN)), a wired network (e.g., Ethernet network), a wireless network (e.g., an 802.11 network or a Wi-Fi network), a cellular network (e.g., a Long Term Evolution (LTE) network), and/or the like. In some embodiments, network 150 may include routers, hubs, switches, server computers, and/or a combination thereof.

In some embodiments, any of AI server 122, server machine 130, and/or user machine(s) 140 may include a desktop computer, a laptop computer, a smartphone, a tablet computer, a server, a scanner, or any suitable computing device capable of performing the techniques described herein. In some embodiments, any of server machine 130 and/or user machine(s) 140 may be (and/or include) one or more computer systems 600 of FIG. 6.

In some embodiments, data store 110 (database, data warehouse, etc.) may store any suitable raw and/or processed data, e.g., user data 112, and/or metadata associated with one or more users of user machine 140 and/or any other users. For example, user data 112 may include (for a particular user) a user identification, a user profile (e.g., address, preferences, settings, traits, etc.), history of user queries, browsing history, and/or any other information associated with the user. User data 112 may also include user's consent to store user's data and/or use user's data in information exchanges with generative model (GM) 120. Data store 110 may further store user group data 114 that may include any information associated with groups of users, e.g., teams, groups, organizations, businesses, with which individual users may be affiliated.

System 100 may further include a data manager (DM) 160 that may be any application configured to manage data transport to and from data store 110, e.g., retrieval of data and/or storage of new data, indexing data, arranging data by user, time, type of activity to which the data is related, associating the data with keywords, and/or the like. DM 160 may collect data associated with various user activities, e.g., performed on websites, applications, internal tools, and/or the like. DM 160 may collect, transform, aggregate, and archive such data in data store 110. In some embodiments, DM 160 may support a suitable software that, with user's consent, resides on user machine(s) 140 and tracks user activities. For example, the DM-supported software may capture user-generated content and convert the captured content into a format that can be used by various content destinations, e.g., QT 101. In some embodiments, the DM-supported software may be a code snippet integrated into user's browsers/apps and/or websites visited by the user. Generating, tracking, and transmitting data may be facilitated by one or more libraries of DM 160. In some embodiments, data may be transmitted using messages in the JSON format. A message may include a user digital identifier, a timestamp, name and version of a library that generated the message, page path, user agent, operating system, settings. A message may further include various user traits, which should be broadly understood as any contextual data associated with user's activities and/or preferences. In some embodiments, user's traits may be indexed using natural language labels (e.g., "age," "address," "shoe size," and/or the like) rather than some abstract identifiers (e.g., "0153"). In such embodiments, the content of user traits may be provisioned to various language models (as part of prompts and/or queries) together with the labels of the traits, which carry useful semantic meaning that can be understood by the language models. DM 160 may track different ways the same user DM 160 may facilitate data suppression/deletion in accordance with various data protection and consumer protection regulations. DM 160 may validate data, convert data into a target format, identify and eliminate duplicate data, and/or the like. DM 160 may aggregate data, e.g., identify and combine data associated with a given user in the user's profile (user's persona), and storing the user's profile on a single memory partition. DM 160 may scan multiple user's profiles to identify and group users that are related to the same organization, activity, interests, and/or the like. DM 160 may scan numerous user's actions and identify user's profiles associated with multiple uses of a particular resource (e.g., web-page or application). DM may ensure reliable delivery of data from user profiles (user personas) to recipients of that data, e.g., by tracking and re-delivering (re-routing) data whose transmission failed.

Data store 110 may be implemented in a persistent storage capable of storing files as well as data structures to perform identification of data, in accordance with embodiments of the present disclosure. Data store 110 may be hosted by one or more storage devices, such as main memory, magnetic or optical storage disks, tapes, or hard drives, network-attached storage (NAS), storage area network (SAN), and so forth. Although depicted as separate from the server machine 130, data store 110 may be part of server machine 130, and/or other devices. In some embodiments, data store 110 may be implemented on a network-attached file server, while in other embodiments data store 110 may be implemented on some other types of persistent storage, such as an object-oriented database, a relational database, and so forth, that may be hosted by a server machine 130 or one or more different machines coupled to server machine 130 via network 150.

Server machine 130 may include QT 101 configured to perform automated identification and facilitate retrieval of relevant and timely contextual information for quick and accurate processing of user queries by generative model 120, as disclosed herein. Via network 150, QT 101 may be in communication with one or more user machines 140, AI server 122, and data store 110, e.g., via DM 160. Communications between QT 101 and AI server 122 may be facilitated by GM API 102. Communications between QT 101 and data store 110/DM 160 may be facilitated by DM API 104. Additionally, GM API 102 may translate various queries generated by QT 101 into unstructured natural-language format and, conversely, translate responses received from generative model 120 into any suitable form (including any structured proprietary format as may be used by QT 101). Similarly, DM API 104 may support instructions that may be used to communicate data requests to DM 160 and formats of data received from data store 110 via DM 160.

A user (customer, etc.) may interact with QT 101 via a user interface (UI) 142. UI 142 may support any suitable types of user inputs, e.g., speech inputs (captured by a microphone), text inputs (entered using a keyboard, touchscreen, or any pointing device), camera (e.g., for recognition of sign language), and/or the like, or any combination thereof. UI 142 may further support any suitable types of outputs, e.g., speech outputs (via one or more speaker), text, graphics, and/or sign language outputs (e.g., displayed via any suitable screen), and/or the like, or any combination thereof. In some embodiments, UI 142 may be a web-based UI (e.g., a web browser-supported interface), a mobile application-supported UI, or any combination thereof. UI 142 may include selectable items. In some embodiments, UI 142 may allow a user to select from multiple (e.g., specialized in particular knowledge areas) generative models 120. UI 142 may allow the user to provide consent for QT 101 and/or generative model 120 to access user data previously stored in data store 110 (and/or any other memory device), process and/or store new data received from the user, and the like. UI 142 may allow the user to withhold consent to provide access to user data to QT 101 and/or generative model 120. User inputs entered via UI 142 may be communicated to QT 101 via a user API 144. In some embodiments, UI 142 and user API 144 may be located on user machine 140 that the user is using to access QT 101. For example, an API package with user API 144 and/or user interface 142 may be downloaded to user machine 140. The downloaded API package may be used to install user API 144 and/or user interface 142 to enable the user to have two-way communication with QT 101.

User UI 142 and user API 144 may establish a user session 146 for the user of user machine 140. User session 146 may be associated with a specific user ID and may be properly authenticated, e.g., using passwords and/or various other techniques of cryptographic protection). In some embodiments, user ID may be associated with subscription services of providers of GM 120.

QT 101 may include a user query analyzer 103 to support various operations of this disclosure. For example, user query analyzer 103 may receive a user input, e.g., user query, and generate one or more intermediate queries to generative model 120 to determine what type of user data GM 120 might need to successfully respond to user input. Upon receiving a response from GM 120, user query analyzer 103 may analyze the response, form a request for relevant contextual data for DM 160, which may then supply such data. User query analyzer 103 may then generate a final query to GM 120 that includes the original user query and the contextual data received from DM 160. In some embodiments, user query analyzer 103 may itself include a lightweight generative model that may process the intermediate query(ies) and determine what type of contextual data may have to be provided to GM 120 together with the original user query to ensure a meaningful response from GM 120.

QT 101 may include (or may have access to) instructions stored on one or more tangible, machine-readable storage media of server machine 130 and executable by one or more processing devices of server machine 130. In one embodiment, QT 101 may be implemented on a single machine (e.g., as depicted in FIG. 1). In some embodiments, QT 101 may be a combination of a client component and a server component. In some embodiments QT 101 may be executed entirely on the user machine(s) 140. Alternatively, some portion of QT 101 may be executed on a client computing device while another portion of QT 101 may be executed on server machine 130.

Figure 2A:
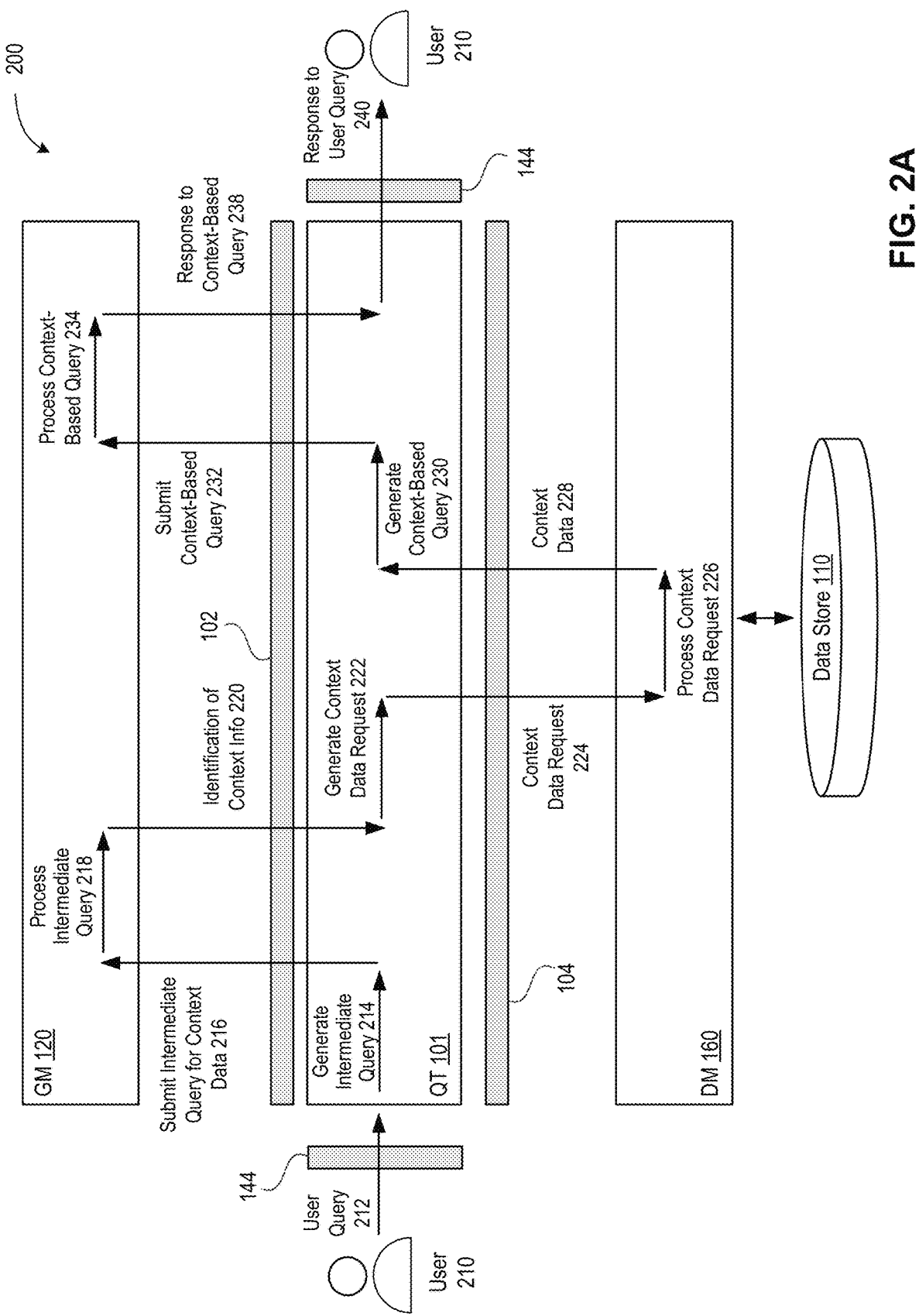
FIG. 2A illustrates an example workflow to perform automated identification and retrieval of relevant contextual information for quick and accurate processing of user queries by generative artificial intelligence models, in accordance with one or more embodiments of the present disclosure.

FIG. 2A illustrates an example workflow 200 to perform automated identification and retrieval of relevant contextual information for quick and accurate processing of user queries by generative artificial intelligence models, in accordance with one or more embodiments of the present disclosure. Example workflow 200 may begin with obtaining an informed consent from a user 210 to share user's data with a third party, e.g., provider of GM 120. A separate consent may be received from the user to store the user's data for processing future queries. Example workflow 200 may include receiving a user query 212 from user 210 (e.g., via user API 144) for processing by GM 120. User query 212 may be a request for any type of information, e.g., a request for general knowledge, a request for specialized (e.g., professional) knowledge, a request to help with planning any user activities, and/or the like. Rather than providing user query 212 directly to GM 120, user query 212 may first be received by AI query tool (QT) 101 for support processing. QT 101 may first analyze user query 212 (e.g., via user query analyzer 103) to determine if user query 212 may be processed as is or if it requires any additional contextual information for successful processing. For example, QT 101 (or user query analyzer 103) may determine if user query 212 is a request for a knowledge that does not require any contextual information, e.g., "what is the radius of Earth?", or a context-dependent request, e.g., "what travel deals are available for the Spring Break week?" If QT 101 determines that user query 212 is context-dependent, QT 101 may generate an intermediate query (operation 214). In some embodiments, the intermediate query may be a general query, e.g., "what information will you need to recommend a Spring Break travel deal to user 210?" QT 101 may submit (e.g., via GM API 102) this (or any other) intermediate query that includes a request for context data to GM 120 (operation 216). In some embodiments, the intermediate query may be a targeted query that includes a representation of the data available in the data store (e.g., "what information from the list of available user's traits, e.g., which includes the user's job history, meals history, travel history, etc., would you find useful in answering the user query?"). In some embodiments, intermediate query 214 may ask GM 120 (or lightweight GM 215) to list the available traits in the order of usefulness in answering user query 212 or to rank the traits using some suggested scale, e.g., 1-5.

GM 120 may process the intermediate query (operation 218) and generate a response to listing some of the contextual data that GM 120 may find useful for answering user query 212, e.g., "the dates of the Spring Break week (or the school the user is attending), the number of days the user plans to travel, the user's budget, the user's prior travels over the last one, two, etc., years," and/or the like. GM 120 may communicate the response with the identification of the contextual information to QT 101 (operation 220). In those instances where intermediate query 214 asked GM 120 (or lightweight GM 215) to rank the available traits, GM 120 may respond with listing the available traits in the level of usefulness (e.g., starting with most useful trait) or marked with usefulness scores, using the suggested scale.

Having received the response from GM 120 to the intermediate query, QT 101 (or user query analyzer 103) may parse the received response and generate one or more requests to DM 160 for contextual data about user 210 (operation 222). For example, the context data request(s) may include a request for the school that user 210 is currently attending, dates and destinations of user's trips over the last two years, costs of those trips, browsing history of user 210, travel destinations researched by user 210 over the last 6 months, and/or the like. The context data requests may include any suitable keywords that QT 101 may request that DM 160 place in search queries with data store 110. QT 101 may then communicate (e.g., via user DM API 104) the context data request(s) to DM 160 (operation 224).

Responsive to receiving the context data request(s), DM 160 may process the received requests (operation 226), which may include running internal search queries (e.g., using keyword searches, Boolean searches, and/or the like) on data store 110. DM 160 may use any suitable indexing schemes to retrieve documents and/or other data from data store 110 that is pertinent to the context data request(s) from QT 101. In some embodiments, the context data may be or include a data stored in association with the user ID of user 210 and may include various data provided by user 210 during previous user sessions and/or data collected (with user's consent) during various activities of user 210, e.g., browsing, querying, shopping, booking travel, and/or the like.

DM 160 may then provide the context data to QT 101. In some embodiments, the context data may be delivered via one or more JSON objects (e.g., JSON files). Having received the requested context data from the data store (operation 228), QT 101 may generate a context-based query (operation 230). Generating the context-based query may include parsing the context data returned by DM 160 for specific pieces of information indicated by GM 120 as a relevant context and integrating these pieces of information into a natural language query (e.g., an unstructured conversational request). For example, the context-based query may be, "what travel deals are available for the Spring Break week of 2023 for User who attends the East Virginia State University and has traveled to Florida and Mexico over the last year?" QT 101 may then submit the generated context-based query to GM 120 (operation 232). In some embodiments, the context may be included as part of a query prompt. In those instances where the response to intermediate query 214 ranked the available traits by the level of usefulness, the context-based query may list a certain number of top traits (including user activities), e.g., 3 or 4 most useful traits, or traits that have been ranked with at least a minimum usefulness score, e.g., at least 3 on the usefulness scale of 1-5.

GM 120 may process the context-based query (operation 234) and communicate a response to the context-based query back to QT 101 (operation 238). Having received the response to the context-based query, QT 101 may form a response to the original user query 212 and communicate the response to user query 212 to user 210 (operation 240). In some instances, QT 101 may determine that the response to the context-based query received from GM 120 is not a definitive response. For example, QT 101 may detect that the response received from GM 120 includes an additional question. In such instances, QT 101 may treat the received response as an intermediate response (similar to operation 220) and repeat operations 222-228 to request and obtain additional context info from DM 160. QT 101 may also repeat operations 230-238 to query GM 120 using an additional context-based query (or multiple queries). In some embodiments, such iterations may be performed several times until a definitive response to user query is received and communicated to user 210.

In some embodiments, the response communicated to the user may be identical to the response to context-based query received from GM 120. In some embodiments, the response communicated to the user may differ from the response received from GM 120. For example, QT 101 may list the context data that QT 101 provided to GM 120, for review by user 210. As a result, any incorrect context data submitted by QT 101 may be corrected by user 210, e.g., by communicating a second user query that points out any inaccuracy in the provided context data.

Figure 2B:
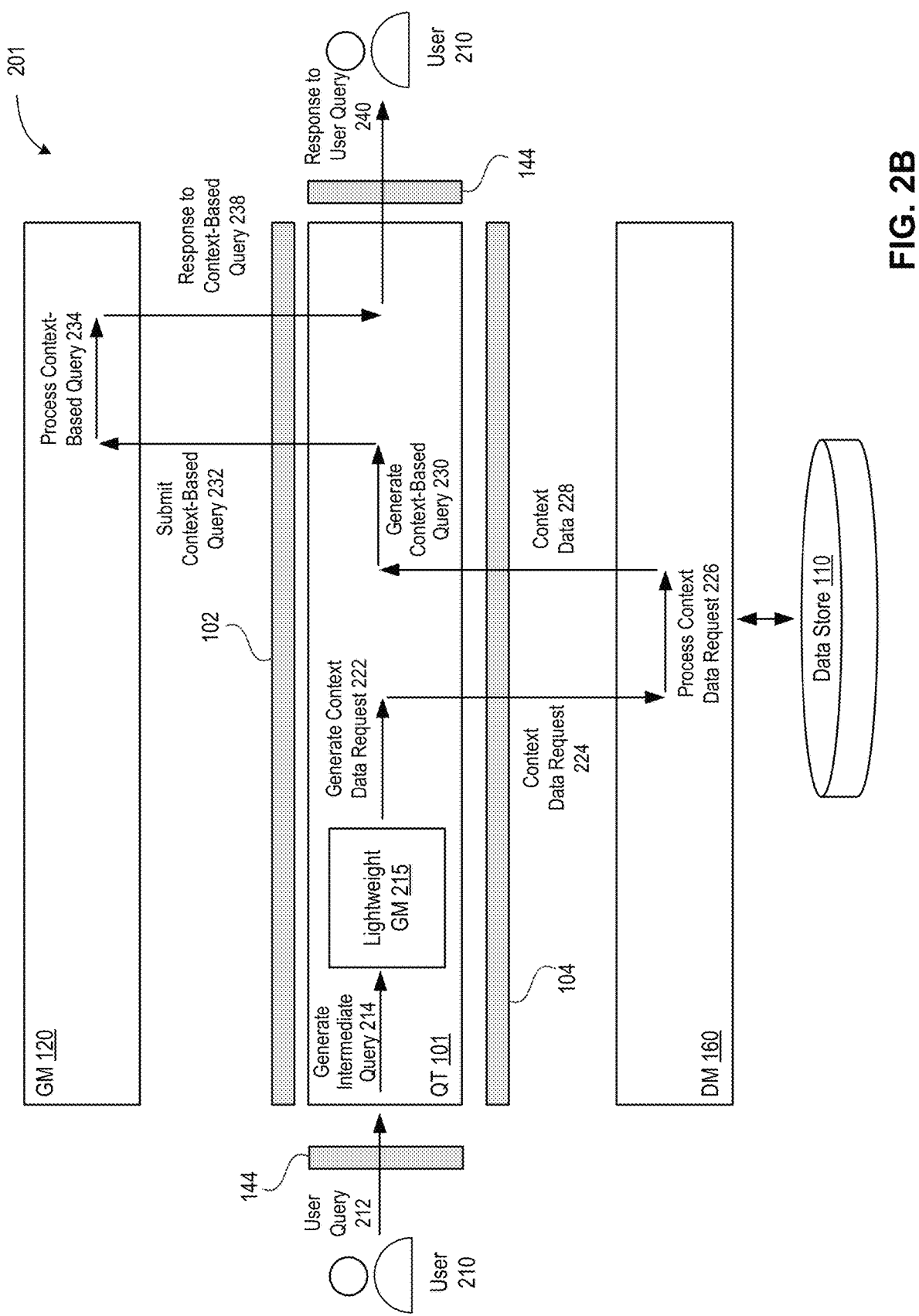
FIG. 2B illustrates another example workflow to perform automated identification and retrieval of relevant contextual information for quick and accurate processing of user queries by generative artificial intelligence models, in accordance with one or more embodiments of the present disclosure.

FIG. 2B illustrates another example workflow 201 to perform automated identification and retrieval of relevant contextual information for quick and accurate processing of user queries by generative artificial intelligence models, in accordance with one or more embodiments of the present disclosure. In the example workflow 201, the intermediate query generated at operation 214 is not provided to GM 120 but is processed internally by QT 101. In some embodiments, the intermediate query is processed by a lightweight GM 215, which may be an NL model, an LLM model, and/or the like. In some embodiments, lightweight GM 215 may be trained using various user queries as training inputs and responses of GM 120 to those queries as ground truth. After lightweight GM 215 has generated a response to the intermediate query, workflow 300 may continue similarly to workflow 200, e.g., QT 101 (or user query analyzer 103) may parse the received response and generate one or more context requests to DM 160 (operation 222).

Other embodiments are within the scope of the present disclosure. In some embodiments, QT 101 may request all data available to DM 160 via data store 110 about user's traits and activities and include such data as part of the context-based query communicated to GM 120 (e.g., via a query prompt).

Figure 3:
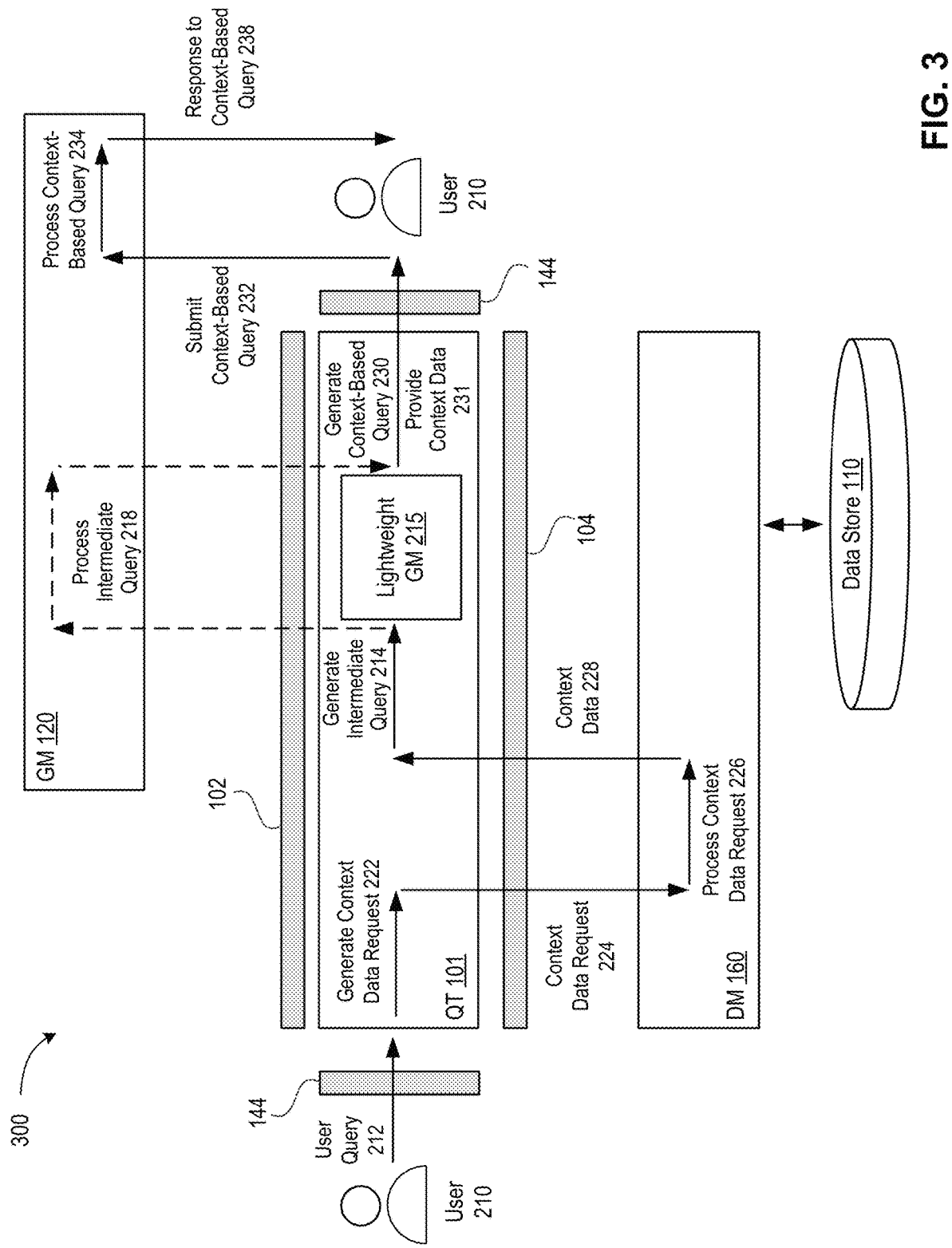
FIG. 3 illustrates yet another example workflow to perform automated identification and retrieval of relevant contextual information for quick and accurate processing of user queries by generative artificial intelligence models, in accordance with one or more embodiments of the present disclosure.

FIG. 3 illustrates yet another example workflow 300 to perform automated identification and retrieval of relevant contextual information for quick and accurate processing of user queries by generative artificial intelligence models, in accordance with one or more embodiments of the present disclosure. In the example workflow 300, QT 101 may receive user query 212 and may generate context data request (operation 222) to DM 160 to fetch user data that is stored in data store 110 and may be relevant to user query 112. The request may be generated based on keywords search of user query 112, based on natural language processing, or in any other suitable way. QT 101 may communicate the context data request to DM 160 (operation 224). Responsive to receiving the context data request, DM 160 may process the received request (operation 226), e.g., as described in conjunction with FIG. 2A, fetch context data from data store 110, and provide the context data to QT 101 (operation 228). Upon receiving the context data, QT 101 may generate an intermediate query (operation 214). In some embodiments, the intermediate query may be processed by lightweight GM 215 (e.g., similarly to operations of FIG. 2B).

In some embodiments, as indicated by the dashed arrows in FIG. 3, the intermediate query may be processed by GM 120 (e.g., similarly to operations of FIG. 2A). In some embodiments, the intermediate query may be a targeted query that includes a representation (e.g., index, listing, summary, digest, etc.) of the context data received from DM 160 but does not include the actual data. The intermediate query may also include a question that prompts lightweight GM 215 (or GM 120) to identify what data referenced in the representation of the context data may be helpful to GM 120 in responding to user query 212. Having received the response from lightweight GM 215 (or GM 120), QT 101 may select relevant context data identified by lightweight GM 215 (or GM 120) as useful for responding to user query 112 and may provide the identified context data to user 210 (operation 231). User 210 may then communicate, to GM 120, the original user query 212 (or any other query) together with the provided context data. In some embodiments, QT 101 may generate and provide to user 210 a context-based query (operation 230). The context-based query may include the original user query 212 and the context data identified by lightweight GM 215 (or GM 120). User 210 may review, modify (if needed), and forward the context-based query to GM 120.

Figure 4:
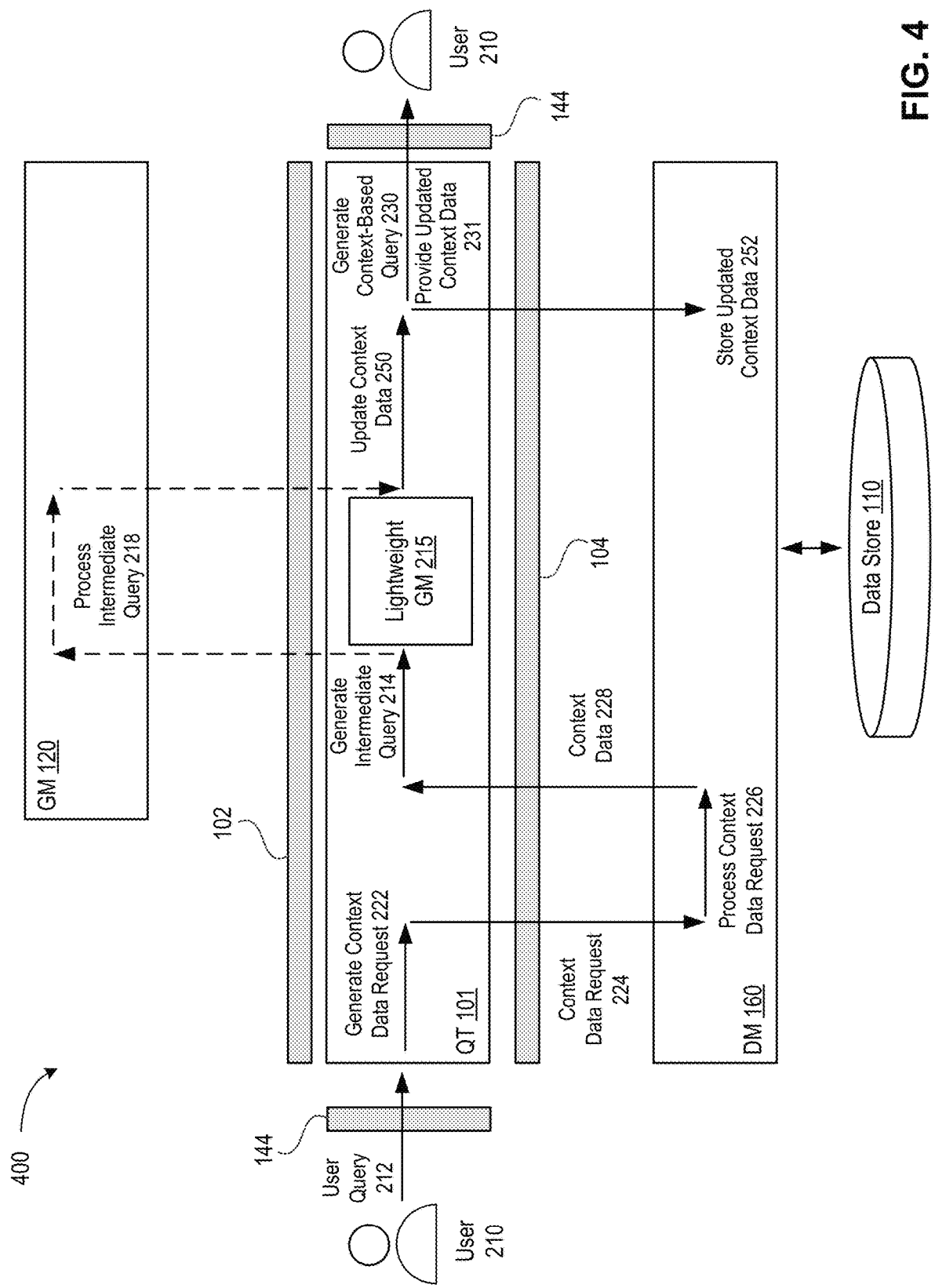
FIG. 4 illustrates an example workflow to perform automated identification, retrieval, and update of relevant contextual information, in accordance with one or more embodiments of the present disclosure.

FIG. 4 illustrates an example workflow 400 to perform automated identification, retrieval, and update of relevant contextual information, in accordance with one or more embodiments of the present disclosure. In the example workflow 400, in addition to processing user query 212, e.g., as described in conjunction with FIGS. 2A-2B and FIG. 3, QT 101 may infer data from user query 212 that may be stored in data store 110 as part of the user profile. For example, user query 212 may include affirmative information about user 210 (e.g., "I recently moved to 101 Spear St.") in addition to one or more questions (e.g., "what restaurants in the area can you recommend?"). QT 101 may generate a context data request (operation 222), communicate the context data request to DM 160 (operation 224), and receive the context data relevant from DM 160. For example, the context data may include cuisine preferences of user 210, previous address of user 210, and or other data from user profile. In addition to generating an intermediate query (operation 214) for lightweight GM 215 (or GM 120), QT 101 may update context data (operation 250). For example, responsive to receiving the context data request, DM 160 may determine that some part of the context data (e.g., address) is obsolete and replace the obsolete part. In some embodiments, QT 101 may use lightweight GM 215 to extract structured data (e.g., address of user 212) from unstructured natural language user query 212. In addition to providing a context-based query (operation 230) or updated context data to user 210 (operation 231), QT 101 may also send the updated context data (or its updated portion) to DM 160, which may store (operation 252) the updated context data (or its updated portion) in data store 110 (e.g., as part of profile of user 210). Although FIG. 3 illustrates updating user profile data in the context of user query 212 processing, similar operations may be used to generate user profiles based on past conversation histories, to perform contact center routing, or in any other context where extracting structured data (e.g., profile entries) from unstructured content (user queries) is advantageous.

Figure 5:
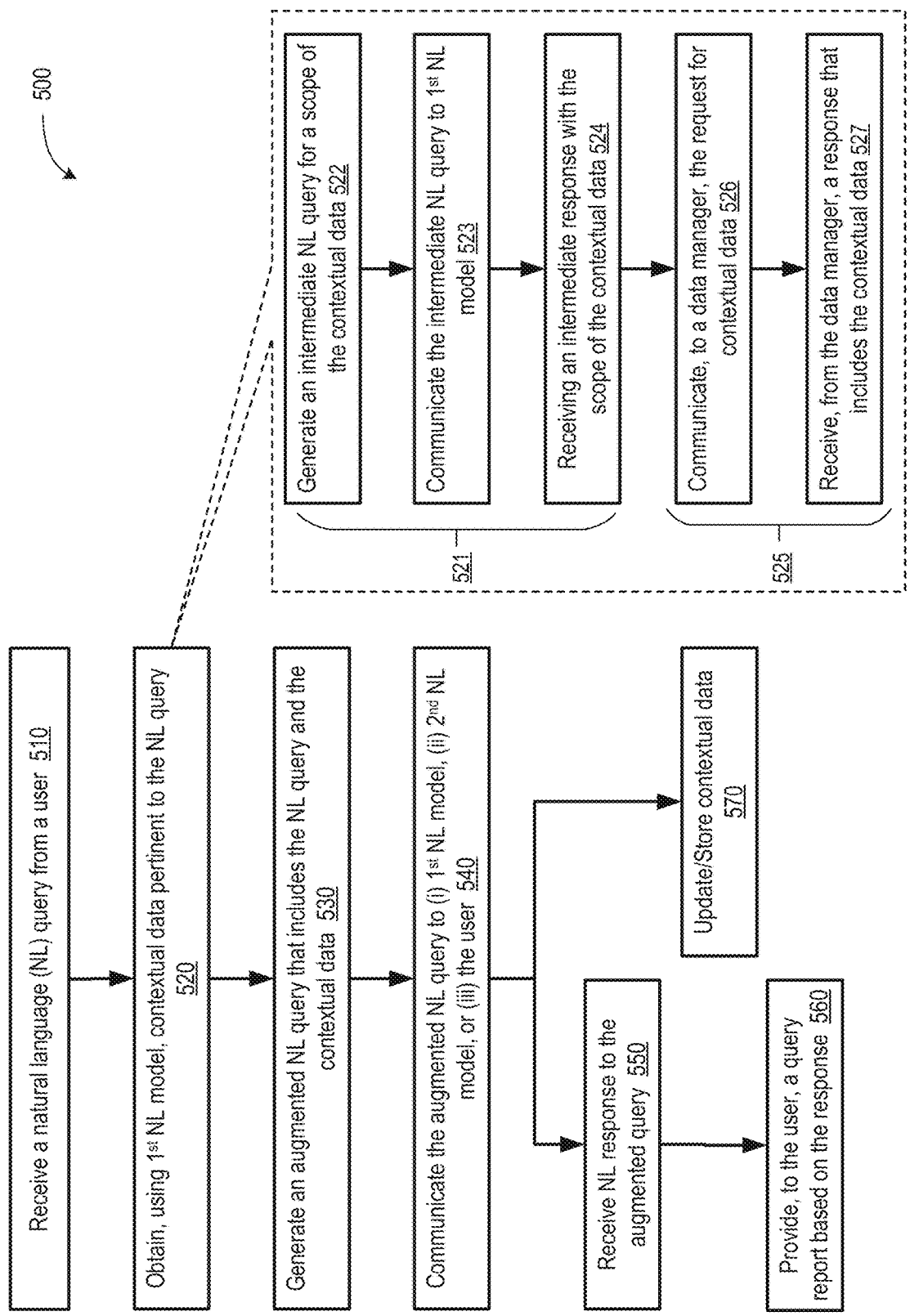
FIG. 5 is a flow diagram of an example method of identification and retrieval of relevant contextual information for quick and accurate processing of user queries by generative artificial intelligence models, in accordance with one or more embodiments of the present disclosure.

FIG. 5 is a flow diagram of an example method 500 of identification and retrieval of relevant contextual information for quick and accurate processing of user queries by generative artificial intelligence models, in accordance with one or more embodiments of the present disclosure. A processing device, having one or more processing units (CPUs) and memory devices communicatively coupled to the CPU(s), may perform method 500 and/or each of its individual functions, routines, subroutines, or operations. The processing device executing method 500 may be a processing device of server machine 130 and/or user machine(s) 140 of FIG. 1. In some embodiments, the processing device executing method 500 may perform instructions issued by QT 101. In certain embodiments, a single processing thread may perform method 500. Alternatively, two or more processing threads may perform method 500, each thread executing one or more individual functions, routines, subroutines, or operations of the methods. In an illustrative example, the processing threads implementing method 500 may be synchronized (e.g., using semaphores, critical sections, and/or other thread synchronization mechanisms). Alternatively, the processing threads implementing method 500 may be executed asynchronously with respect to each other. Various operations of method 500 may be performed in a different order compared with the order shown in FIG. 5. Some operations of method 500 may be performed concurrently with other operations. Some operations may be optional.

At block 510, method 500 may include receiving a natural language (NL) query (e.g., user query 212, as illustrated in FIGS. 2-4). The NL query may be associated with a user identifier (ID) of a user who has submitted the NL query (e.g., via a user interface (UI) during a user session associated with the user ID). At block 520, method 500 may include obtaining, using a first NL generative model, contextual data pertinent to the NL query. The contextual data may be associated with the user/user ID and may include user traits, browsing history, query history, and/or the like. In some embodiments, the contextual data may include a record of prior activities of the user of a type referenced in the NL query. In some embodiments, the first NL generative model (to which the NL query is directed) may be GM 120 (e.g., as illustrated in FIG. 2A) external to QT 101. In some embodiments, the first NL generative model may be lightweight GM 215 that is internal to QT 101 (e.g., as illustrated in FIG. 2B).

In some embodiments, block 520 may include operations illustrated in the callout portion of FIG. 5. More specifically, operations of block 520 may include generating a request for contextual data to the first NL generative model or a second generative model (operations 521) and may further include obtaining a response that includes the requested contextual data (operations 525). More specifically, generating the request for the contextual data (e.g., operation 224 in FIGS. 2-4) may include, at block 522, generating an intermediate NL query that includes an inquiry for a scope of the contextual data that is to facilitate processing of the NL query by the first generative model. In some embodiments, the contextual data is to facilitate processing of the NL query by a second NL generative model different from the first NL generative model. For example, if the first NL generative model is lightweight GM 215, the second NL generative model may be GM 120 (or vice versa). In some embodiments, the first NL generative model and/or the second NL generative model may be or include a large language model (LLM).

At block 523, operations 521 may include communicating the intermediate NL query to the first NL generative model. In some embodiments, the intermediate NL query may be a query that asks the first NL generative model to identify a type of contextual data that may be useful (to the first NL generative model or the second NL generative model) in responding to the NL query received at block 510. At block 524, operations 521 may include receiving an intermediate response from the first NL conversation model, the intermediate response including the scope of the contextual data.

Operations 525 performed to obtain the contextual data may include, at block 526, communicating, to a data manager application (e.g., DM 160), the request for contextual data (e.g., operation 224 in FIGS. 2-4). The request for the contextual data may be based on the scope of the contextual data identified in the response received, at block 524, from the first NL generative model. At block 527, operations 525 may include receiving, from the data manager application, a response that includes the contextual data (e.g., data retrieved from DM 160 from data store 110). The contextual data received from the data manager application may include one or more JSON objects.

At block 530, method 500 may continue with generating, by the processing device, an augmented NL query that is based on the NL query and the contextual data, e.g., may include the original user query and the contextual data. In some embodiments, the augmented NL query may include a processed representation of the contextual data identifying one or more types of information in the contextual data. For example, the contextual data may be in a structured format while the processed representation of the contextual data may be in a natural language form.

At block 540, method 500 may include communicating the augmented NL query to a recipient. In some embodiments, the recipient of the augmented NL query can be the first NL generative model or the second NL generative model. For example, a context-based query in FIG. 2A and/or FIG. 2B) can be communicated to GM 120 during operation 232. In some embodiments, the recipient of the augmented NL query can be a user session associated with the user ID, e.g., as illustrated in FIG. 3 and/or FIG. 4 (with the user subsequently communicating the augmented NL query to the first NL generative model, the second NL generative model, and/or some other model). In some embodiments, communicating the augmented NL query to the recipient may be facilitated by an API capable of converting a structured query into an unstructured NL query (e.g., GM API 102).

In some embodiments, at block 550, method 500 may continue with receiving, in response to the augmented NL query, a query report from the first NL generative model or the second NL generative model. At block 560, method 500 may include providing (e.g., via the UI), a query report to the user session associated with the user ID (e.g., providing response to user query during operation 240 in FIG. 2A and/or FIG. 2B). The query report may include the NL response or a modified NL response (e.g., operation 230 in FIG. 2A-2C). In some embodiments, the query report may include a portion of the contextual data identified in the NL response as being relevant to the user query (e.g., operation 231 in FIG. 3). In some embodiments, method 500 may include, at block 570, updating the obtained contextual data based on an information in the NL query, and storing, using the data manager application (e.g., DM 160), the updated contextual data (e.g., in data store 110). For example, the contextual data may be updated with new address, temporary location of the user, employment history of the user, travel destinations/plans of the user, interests of the user, preferences of the user, and/or any other information that may be gleaned from the NL query. Prior to storing, QT 101 and/or DM 160 may ask the user's permission to update the contextual data.

Figure 6:
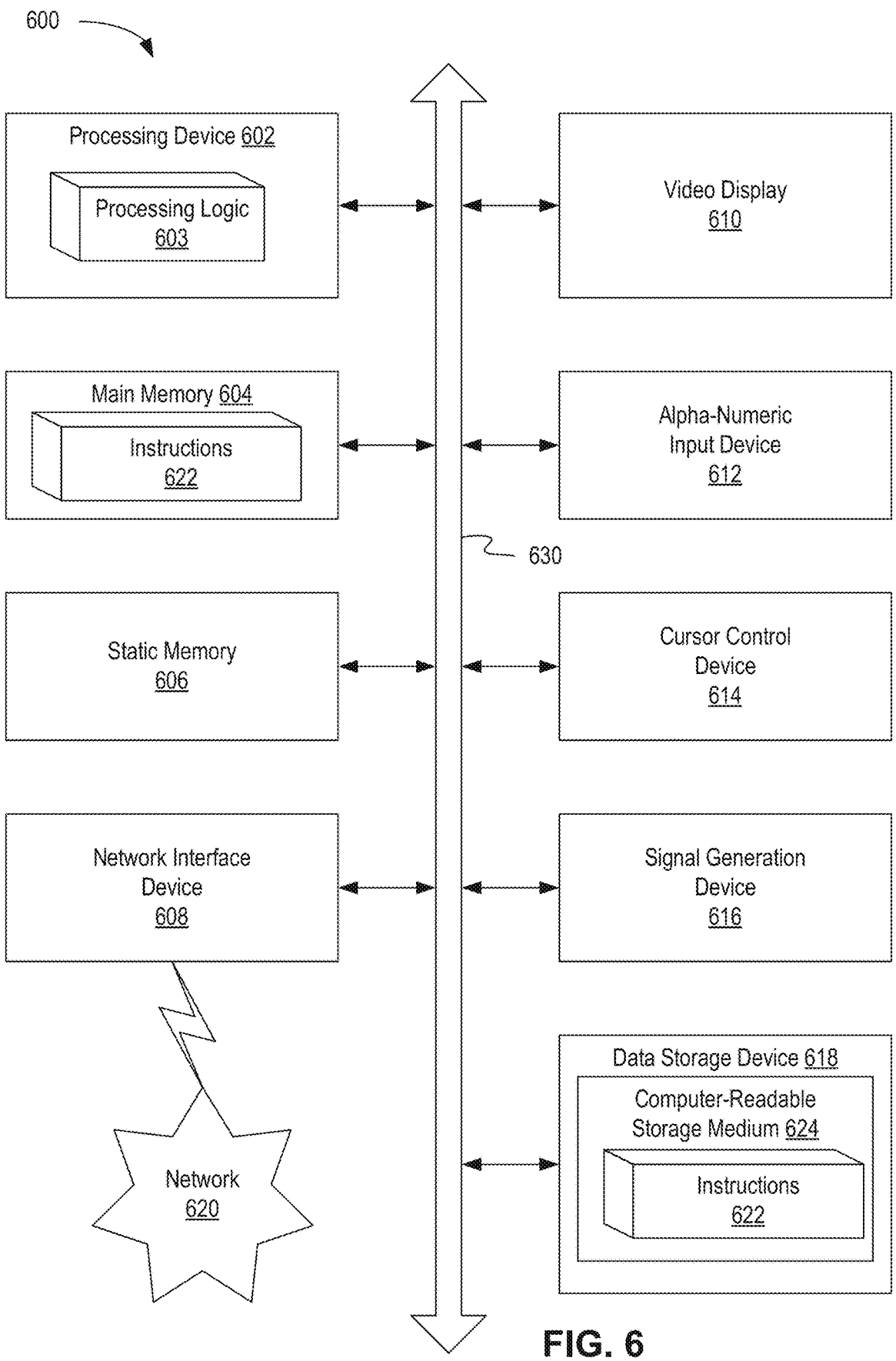
FIG. 6 depicts an example computer system that can perform any one or more of the methods described herein, in accordance with some embodiments of the present disclosure.

FIG. 6 depicts an example computer system 600 that can perform any one or more of the methods described herein, in accordance with some embodiments of the present disclosure. The computer system may be connected (e.g., networked) to other computer systems in a LAN, an intranet, an extranet, or the Internet. The computer system may operate in the capacity of a server in a client-server network environment. The computer system may be a personal computer (PC), a tablet computer, a set-top box (STB), a Personal Digital Assistant (PDA), a mobile phone, a camera, a video camera, or any device capable of executing a set of instructions (sequential or otherwise) that specify actions to be taken by that device. Further, while only a single computer system is illustrated, the term "computer" shall also be taken to include any collection of computers that individually or jointly execute a set (or multiple sets) of instructions to perform any one or more of the methods discussed herein.

The exemplary computer system 600 includes a processing device 602, a main memory 604 (e.g., read-only memory (ROM), flash memory, dynamic random access memory (DRAM) such as synchronous DRAM (SDRAM)), a static memory 606 (e.g., flash memory, static random access memory (SRAM)), and a data storage device 618, which communicate with each other via a bus 630.

Processing device 602 (which can include processing logic 603) represents one or more general-purpose processing devices such as a microprocessor, central processing unit, or the like. More particularly, the processing device 602 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processing device 602 may also be one or more special-purpose processing devices such as an application specific integrated circuit (ASIC), a field programmable gate array (FPGA), a digital signal processor (DSP), network processor, or the like. The processing device 602 is configured to execute instructions 622 for implementing method 500 of identification and retrieval of relevant contextual information for quick and accurate processing of user queries by generative artificial intelligence models).

The computer system 600 may further include a network interface device 608. The computer system 600 also may include a video display unit 610 (e.g., a liquid crystal display (LCD) or a cathode ray tube (CRT)), an alphanumeric input device 612 (e.g., a keyboard), a cursor control device 614 (e.g., a mouse), and a signal generation device 616 (e.g., a speaker). In one illustrative example, the video display unit 610, the alphanumeric input device 612, and the cursor control device 614 may be combined into a single component or device (e.g., an LCD touch screen).

The data storage device 618 may include a computer-readable storage medium 624 on which is stored the instructions 622 embodying any one or more of the methodologies or functions described herein. The instructions 622 may also reside, completely or at least partially, within the main memory 604 and/or within the processing device 602 during execution thereof by the computer system 600, the main memory 604 and the processing device 602 also constituting computer-readable media. In some embodiments, the instructions 622 may further be transmitted or received over a network 620 via the network interface device 608.

While the computer-readable storage medium 624 is shown in the illustrative examples to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present disclosure. The term "computer-readable storage medium" shall accordingly be taken to include, but not be limited to, solid-state memories, optical media, and magnetic media.

Although the operations of the methods herein are shown and described in a particular order, the order of the operations of each method may be altered so that certain operations may be performed in an inverse order or so that certain operations may be performed, at least in part, concurrently with other operations. In certain embodiments, instructions or sub-operations of distinct operations may be in an intermittent and/or alternating manner.

It is to be understood that the above description is intended to be illustrative, and not restrictive. Many other embodiments will be apparent to those of skill in the art upon reading and understanding the above description. The scope of the disclosure should, therefore, be determined with reference to the appended claims, along with the full scope of equivalents to which such claims are entitled.

In the above description, numerous details are set forth. It will be apparent, however, to one skilled in the art, that the aspects of the present disclosure may be practiced without these specific details. In some instances, well-known structures and devices are shown in block diagram form, rather than in detail, in order to avoid obscuring the present disclosure.

Some portions of the detailed descriptions above are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "receiving," "determining," "selecting," "storing," "analyzing," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present disclosure also relates to an apparatus for performing the operations herein. This apparatus may be specially constructed for the required purposes, or it may comprise a general purpose computer selectively activated or reconfigured by a computer program stored in the computer. Such a computer program may be stored in a computer-readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear as set forth in the description. In addition, aspects of the present disclosure are not described with reference to any particular programming language. It will be appreciated that a variety of programming languages may be used to implement the teachings of the present disclosure as described herein.

Aspects of the present disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing or transmitting information in a form readable by a machine (e.g., a computer). For example, a machine-readable (e.g., computer-readable) medium includes a machine (e.g., a computer) readable storage medium (e.g., read-only memory ("ROM"), random access memory ("RAM"), magnetic disk storage media, optical storage media, flash memory devices, etc.).

The words "example" or "exemplary" are used herein to mean serving as an example, instance, or illustration. Any aspect or design described herein as "example" or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an embodiment" or "one implementation" or "an implementation" or "one implementation" throughout is not intended to mean the same implementation or implementation unless described as such. Furthermore, the terms "first," "second," "third," "fourth," etc. as used herein are meant as labels to distinguish among different elements and may not necessarily have an ordinal meaning according to their numerical designation.

Whereas many alterations and modifications of the disclosure will no doubt become apparent to a person of ordinary skill in the art after having read the foregoing description, it is to be understood that any particular implementation shown and described by way of illustration is in no way intended to be considered limiting. Therefore, references to details of various implementations are not intended to limit the scope of the claims, which in themselves recite only those features regarded as the disclosure.

What is claimed is:

1. A method comprising:
receiving, by a processing device, a natural language (NL) query associated with a user identifier (ID);
generating, by the processing device executing instructions of a generative model application programming interface (API), an intermediate prompt to a first NL generative model to identify a scope of contextual data that is to facilitate processing of the NL query by at least one of the first NL generative model or a second NL generative model, wherein the intermediate prompt comprises a request to rank at least a subset of the contextual data in order of usefulness of the subset of the contextual data in facilitating processing of the NL query;
causing, by the processing device, the first NL generative model to process the intermediate prompt to identify the scope of the contextual data, wherein causing the first NL generative model to process the intermediate prompt comprises:
translating, using the generative model API, the intermediate prompt from an NL format to an input format of the first NL generative model;
communicating the translated intermediate prompt to the first NL generative model; and
receiving an intermediate response from the first NL generative model, wherein the intermediate response comprises the scope of the contextual data;
obtaining, from a data store, the contextual data stored in the data store in association with the user ID;
generating, by the processing device, an augmented NL query that is based on the NL query and the contextual data; and
communicating the augmented NL query to a recipient, wherein the recipient comprises at least one of:
the first NL generative model,
a second NL generative model, or
a user session associated with the user ID.

2. The method of claim 1, wherein the first NL generative model comprises a large language model (LLM).

3. The method of claim 1, wherein the augmented NL query is communicated to the user session associated with the user ID, and wherein the augmented NL query comprises a portion of the contextual data identified in the intermediate response as being relevant to the NL query.

4. The method of claim 1, wherein obtaining the contextual data comprises:
communicating, to a data manager application communicatively coupled to the data store, a request for the contextual data; and
receiving, from the data manager application, a response comprising the contextual data retrieved from the data store.

5. The method of claim 1, wherein the contextual data is stored in the data store in association with the user ID comprises a record of activities of a user associated with the user ID, wherein the activities precede a current session in which the NL query is received.

6. The method of claim 1, wherein communicating the augmented NL query to the recipient comprises converting a structured query into an unstructured NL query.

7. The method of claim 1, wherein the contextual data comprises one or more JSON objects.

8. The method of claim 1, wherein the augmented NL query comprises a representation of the contextual data identifying one or more types of information in the contextual data.

9. The method of claim 1, wherein the augmented NL query is communicated to the first NL generative model or the second NL generative model, the method further comprising:
receiving an NL response to the augmented NL query; and
providing, based on the NL response, a query report to the user session associated with the user ID, wherein the query report comprises one or more of:
the NL response,
a modified NL response.

10. The method of claim 1, further comprising:
  updating the obtained contextual data based on an information in the NL query; and
  storing, using a data manager application, the updated contextual data in the data store.

11. A system comprising:
  a memory device, and
  a processing device communicatively coupled to the memory device, the processing device to:
    receive a natural language (NL) query associated with a user identifier (ID);
    generate, by a generative model application programming interface (API), an intermediate prompt to a first NL generative model to identify a scope of contextual data that is to facilitate processing of the NL query by at least one of the first NL generative model or a second NL generative model, wherein the intermediate prompt comprises a request to rank at least a subset of the contextual data in order of usefulness of the subset of the contextual data in facilitating processing of the NL query;
    cause the first NL generative model to process the intermediate prompt to identify the scope of the contextual data, wherein to cause the first NL generative model to process the intermediate prompt, the processing device is to:
      translate, using the generative model API, the intermediate prompt from an NL format to an input format of the first NL generative model;
      communicate the translated intermediate prompt to the first NL generative model; and
      receive an intermediate response from the first NL generative model, wherein the intermediate response comprises the scope of the contextual data;
    obtain, from a data store, the contextual data stored in the data store in association with the user ID;
    generate an augmented NL query that is based on the NL query and the contextual data; and
    communicate the augmented NL query to a recipient, wherein the recipient comprises at least one of:
      the first NL generative model,
      a second NL generative model, or
      a user session associated with the user ID.

12. The system of claim 11, wherein to the contextual data, the processing device is to:
  communicate, to a data manager application, communicatively coupled to the data store, a request for the contextual data; and
  receive, from the data manager application, a response comprising the contextual data retrieved from the data store.

13. The system of claim 11, wherein to communicate the augmented NL query to the recipient, the processing device is to convert a structured query into an unstructured NL query.

14. The system of claim 11, wherein the augmented NL query is communicated to the first NL generative model or the second NL generative model, and wherein the processing device is further to:
  receive an NL response to the augmented NL query; and
  provide, based on the NL response, a query report to the user session associated with the user ID, wherein the query report comprises one or more of:
    the NL response,
    a modified NL response.

15. The system of claim 14, wherein the processing device is further to:
  update the obtained contextual data based on an information in the NL query; and
  store, using a data manager application, the updated contextual data in the data store.

16. A non-transitory computer-readable storage medium storing instructions that, when executed by a processing device, cause the processing device to:
  receive a natural language (NL) query associated with a user identifier (ID);
  generate, by a generative model application programming interface (API), an intermediate prompt to a first NL generative model to identify a scope of contextual data that is to facilitate processing of the NL query by at least one of the first NL generative model or a second NL generative model, wherein the intermediate prompt comprises a request to rank at least a subset of the contextual data in order of usefulness of the subset of the contextual data in facilitating processing of the NL query;
  cause the first NL generative model to process the intermediate prompt to identify the scope of the contextual data, wherein to cause the first NL generative model to process the intermediate prompt, the processing device is to:
    translate, using the generative model API, the intermediate prompt from an NL format to an input format of the first NL generative model;
    communicate the translated intermediate prompt to the first NL generative model; and
    receive an intermediate response from the first NL generative model, wherein the intermediate response comprises the scope of the contextual data;
  obtain, from a data store, the contextual data stored in the data store in association with the user ID; and
  generate an augmented NL query that is based on the NL query and the contextual data; and
  communicate the augmented NL query to a recipient, wherein the recipient comprises at least one of:
    the first NL generative model,
    a second NL generative model, or
    a user session associated with the user ID.

* * * * *